United States Patent [19]
Carbonnel et al.

[11] 3,787,143
[45] Jan. 22, 1974

[54] IMMERSION PUMP FOR PUMPING CORROSIVE LIQUID METALS

[75] Inventors: Henri Carbonnel, Antony; Robert Borie, Sceaux, both of France

[73] Assignee: Groupement Atomique Alsacienne Atlantique, Le Plessis Robinson, France

[22] Filed: Mar. 16, 1972

[21] Appl. No.: 235,271

[30] Foreign Application Priority Data
Mar. 16, 1971 France .............................. 71.09159
Mar. 30, 1971 France .............................. 71.11143

[52] U.S. Cl. .............................................. 417/50
[51] Int. Cl. .............................................. H02k 1/12
[58] Field of Search ...... 266/38; 310/11, 13, 86, 87; 417/50

[56] References Cited
UNITED STATES PATENTS

| | | | |
|---|---|---|---|
| 2,612,109 | 9/1952 | Wakefield | 417/50 |
| 2,838,001 | 6/1958 | Robinson | 417/50 |
| 2,988,997 | 6/1961 | Elrod | 417/50 |
| 3,045,599 | 7/1962 | Carlson | 417/50 |
| 3,088,411 | 5/1963 | Schmidt | 417/50 |
| 3,092,030 | 6/1963 | Wunder | 266/38 X |
| 3,115,837 | 12/1963 | Campana | 417/50 |
| 3,149,253 | 9/1964 | Luebke | 310/11 |
| 3,288,069 | 11/1966 | Michaux | 417/50 |
| 3,459,133 | 8/1969 | Scheffler | 266/38 X |
| 3,566,684 | 3/1971 | King | 310/11 X |

*Primary Examiner*—William L. Freeh
*Attorney, Agent, or Firm*—Richard C. Sughrue et al.

[57] ABSTRACT

Immersion pump having slight bulk, for liquid metals, operating by conduction, consisting of one or two magnetic circuits, a conduction loop made of liquid metal and of two electrodes limiting the liquid metal duct in the active zone. A refractory material is cast round the components of the pump, and protects them against the corrosive action of the liquid metal. The part which is not immersed comprising the induction windings of the magnetic circuits is protected by a cast aluminum steel housing.

8 Claims, 2 Drawing Figures

PATENTED JAN 22 1974 3,787,143

IMMERSION PUMP FOR PUMPING CORROSIVE LIQUID METALS

BACKGROUND OF THE INVENTION

1. Field of the Invention

The present invention concerns an immersion pump for corrosive liquid metals such as aluminum, zinc, cast iron or steel, set in motion under the combined action of a magnetic induction and of a current flowing between two electrodes through the liquid metal.

2. Description of the Prior Art

It is known that such pumps are called conduction pumps, as opposed to those called induction pumps, in which the liquid metal is drawn along the duct by a sliding magnetic field in the same conditions as in a linear motor.

It is also known that numerous difficulties are encountered in immersing induction pumps in a liquid metal, because of the induction windings mounted along the liquid metal duct, this raising serious problems related to the cooling of these windings.

These considerations have led the applicants to contrive a means enabling the adapting for immersion of the "conduction pump for corrosive liquid metals" which is fully described in commonly assigned U.S. application Pat. No. 235,278, filed concurrently herewith.

In the pump which was the object of the above application, the section of liquid metal flow subjected to the combined action of magnetic induction and of a current which is perpendicular to it, is limited on two opposite sides by two electrodes provided with means ensuring their adaptation with respect to corrosive metals, the other sides being made of a refractory material forming the rest of the duct cast or machined when the pump was manufactured.

According to the above-identified patent application, it can be seen that at the level of the conduction loop, the active part of the pump is supported in a certain quantity of refractory material forming a part of the duct.

It then appeared to the applicants that it was possible to produce a pump specially adapted for immersion in a corrosive liquid metal, provided a certain number of improvements are made to the pump.

The applicants have, more particularly, perfected an ingenious device providing excellent electrical continuity between the coil and the liquid metal flow by forming the conduction loop with a liquid metal and by using as an electrode a porous refractory support which resists very reactive liquid metals such as aluminum; electrical continuity between the liquid coil and the liquid metal flow being provided by the previous penetration or impregnation of the liquid metal in the porous refractory ceramic material. A conductive loop of liquid metal can, to great advantage, be produced with the very corrosive liquid metal flowing within the pump body.

Such a construction of immersion pumps for very corrosive liquid metals evidently has many advantages. One of these is the possibility of bringing only one pump into play for the pumping of various metals, each more corrosive than the others.

The object of the invention is therefore an immersion pump having slight bulk, for very corrosive liquid metals, operating by conduction, consisting at least of a liquid metal duct, a conduction coil electrically connected to two electrodes, a magnetic circuit, and comprising a pump body protected by a housing, characterized in that the conduction coil is made of a liquid metal.

The object of the invention is also an immersion pump having slight bulk, for very corrosive liquid metals, characterized in that the liquid metal forming the induction loop is the very corrosive liquid metal conveyed by the pumps.

SUMMARY OF THE INVENTION

To produce the electrodes limiting the liquid coil, it can be an advantage to use a metal of the VIth group of metals of the periodic classification of elements, protected on both sides by a conductive layer insensitive to reactive metals.

The duct limiting the liquid coil is made of a refractory material. A block of refractory material which also encloses the other elements of the pump is cast around the duct at the time of manufacturing.

The object of the invention is, therefore, also an immersion pump having slight bulk, for very corrosive liquid metals, operating by conduction, consisting of a liquid metal loop ending in two electrodes, and at least a liquid metal duct and a magnetic circuit, a pump body protected by a housing, characterized in that the pump body comprises a block of refractory material having a substantially cylindrical or polyhedrical external shape cast round the elements forming the pump, to support them in a predetermined position and to isolate them from any accidental contact with the corrosive liquid metal.

In such an immersion pump, only the lower part of the pump body is immersed. That part comprises, more particularly, the conduction loop, and two vertical ducts making it possible to fill the coil by metallostatic pressure. In most cases, they are replaced by channels opening out into the pump duct. Moreover, if the ceramic substance is not sufficiently porous, a duct makes the top of that coil communicate with the upper part of the pump in order to evacuate the air at the time of the first filling, and to avoid the possible forming of a layer of gas or vapor.

The pump body, being completely filled with refractory material, provides perfect protection of the various components of the active part of the pump with respect to the corrosive liquid metal. Moreover, the fact that the windings of the magnetic circuits are arranged above the pump body greatly decreases the volume of the immersed part of the pump while making thermal protection of these latter easier.

When the pump is immersed in a crucible containing a corrosive liquid metal itself arranged in a furnace, the parts of the pump which are not embedded in the refractory material, more particularly the induction windings, are subjected to the corrosive action of the various vapors which are generated there: hot hydrocarbon vapors coming from the furnace, hot metal vapors or the like coming from the crucible. The applicant has designed a protection means for these elements, using a housing, but it is not easy to provide a housing in the form of massive metallic parts providing, at the same time, the rigidity of the unit, the immobility of the windings and effective protection against hydrocarbon vapors. After many trials, the applicant has produced a cast aluminum steel housing containing a high percentage (between 18 percent and 25 percent) of aluminum which has all the required qualities. More particularly, its modulus of elasticity decreases by only a half when the heat rises from ambient temperature at 800° C.

The applicant has therefore contrived to protect the upper part of the pump with a cast aluminum steel housing consisting of two substantially cylindrical parts bearing against each other through a flange, the lower part of the housing covering the part of the body which is not immersed, whereas the upper part of the housing protects the windings. At its upper part, the housing is drilled with an opening allowing the heat-proof liquid metal outlet duct to pass through.

The housing thus designed provides thermal and chemical protection of the induction windings with respect to corrosive vapors; moreover, it protects them from the infra-red radiation generated in the furnace and in the liquid metal. Nevertheless, to keep the windings at a temperature which can be easily tolerated by conventional insulators, the applicant has considered it necessary to install a coolant forced flow device, the coolant being air whenever possible.

The invention will be better understood on referring to the example of an embodiment described below having no limiting character.

DESCRIPTION OF THE PREFERRED EMBODIMENT

Figure 1:
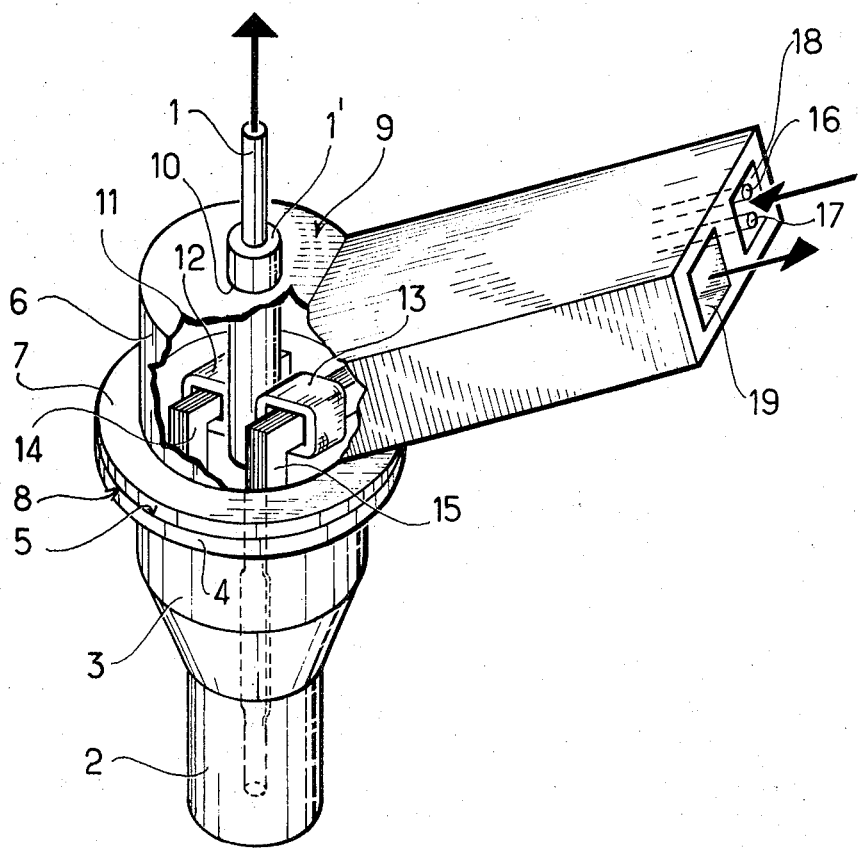
FIG. 1 is a perspective view partially broken away of a pump incorporating the present invention.

FIG. 1 shows, at 1, the liquid metal duct placed in the axis of the pump body 2 consisting externally of a cast cylinder made of refractory material containing, at its center, all the active part of the pump. The pump body ends, at its upper part, in a shoulder (not shown) on which the lower housing 3 rests. This lower housing, which has a truncated cone shaped base, and is otherwise cylindrical, ends, at its upper part, in a flange 4 whose upper section 5 is faced. The upper housing 6, likewise made of a refractory material and; having a generally cylindrical shape, ending, at its base, in a flange 7 whose lower section 8 is also faced so as to provide, between the two housings 4 and 6, sufficient fluid-tight sealing, which is, moreover, reinforced by flanges, bears against that upper section 5. The upper part of the housing 6 consists of a disc 9 in which is drilled a fairly wide circular opening 10 allowing the upper liquid metal duct 1 surrounded by a heat-proofing element 1' to pass through.

At the top, an opening 11 has been made in the upper housing by bending away the same, to make it possible to show the two induction windings 12 and 13 arranged respectively on the magnetic circuits 14 and 15. It can thus be seen that almost all of the magnetic circuits are embedded in the refractory material fast with the pump body, excepting the part of the magnetic circuits close to the windings 12 and 13. The cooling of the windings is provided by a cold air duct 18. The hot air outlet duct 19 can be fast with the cold air duct 18, as shown in FIG. 1, but it can also lead out on another side, for example diametrically opposite, according to the arrangement of the furnace. The applicant has placed, in the cold air duct 18, the cables 16 and 17 intended for supplying electricity to the pump.

Figure 2:
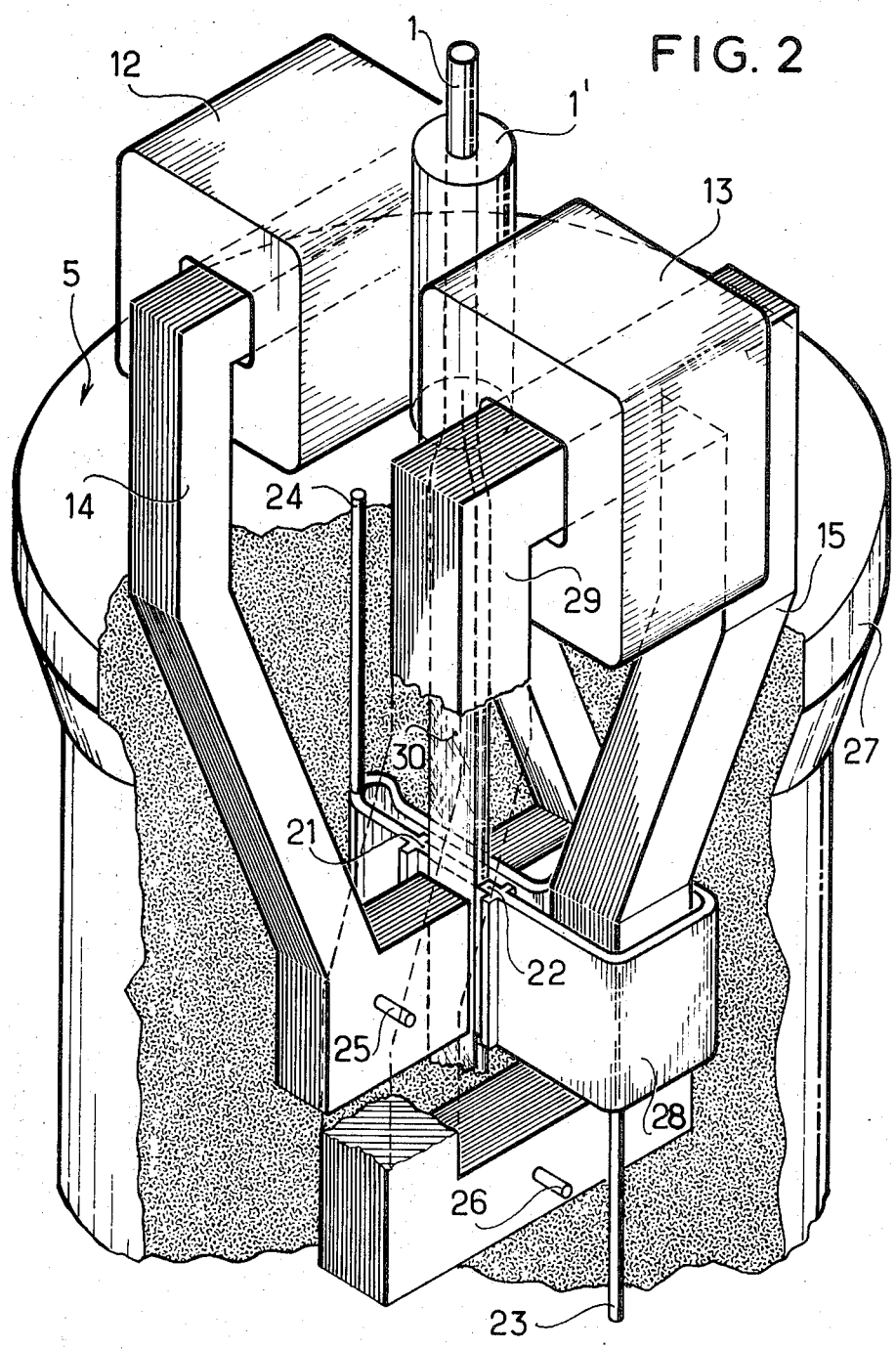
FIG. 2 is a perspective view, partially broken away, of a pump body according to the invention in which the induction coil consists at least of the corrosive liquid metal to be pumped.

In the example of the embodiment, the housing has been made of cast steel at a moderate price, containing 2 to 3 percent of nickel, 19 to 21 percent of aluminum, 1 percent of silicon, these additives being mixed with the cast iron to provide the best protection against hydrocarbons, while considerably improving its mechanical properties at high temperature. The housing is cast, then machined and finally brought to a temperature in the order of 1100° C to cause the forming of a stable compound with the grains of aluminum barred by the machining. Lastly, to make the machining thereof easier, 0.5 of cerium and 1 of molybdenum have also been added. To produce the housing, a certain quantity of aluminum can also be incorporated, in the cast iron, with nickel or with chrome or with nickel-chrome, at a higher cost. The windings and the upper parts are mechanically connected to the upper housing, which provides the rigidity thereof, by any appropriate means (not shown). FIG. 2 shows the active part of the pump body used in the pumping of aluminum. The two magnetic circuits 14 and 15, and the two windings 12 and 13 in FIG. 1 can here be distinguished. The liquid metal outlet duct 1, surrounded by its heat-proofing element 1', can also be seen. The duct, having a generally cylindrical shape, assumes, in the vicinity of the active loop 28 formed by corrosive liquid metal, a parallelepipedic shape 29 analogous to that of the section 30 where the liquid metal flow is subjected to the magnetic induction set up by the main magnetic circuit 14 and simultaneously to the current induced in the loop 28 running in the metal flow by means of the electrodes 21 and 22, as described in the previously mentioned patent application.

These electrodes 21 and 22, consisting, in the present case, of porous refractory material, are previously impregnated with the corrosive liquid metal to be pumped, which is aluminum, in the example described.

The existence of a duct 23 which enables the filling of the loop 28 when the pump is immersed may also be observed. As has been stated above, it has been found that certain ceramic materials are insufficiently porous to allow the air and gases contained in the loop 28 to escape when it is filled; the evacuation of the air and gases contained in the loop 28 is therefore effected upwards through the duct 24. The existence of fixing parts 25 and 26 should also be noted. These parts enable the fixing of the magnetic circuits when the refractory material is cast and permit the securing of the various components of the pump body. Furthermore, it will be observed that there is, at the upper part of the body, a shoulder 27, not shown in FIG. 1, on which the lower housing 3 rests, as previously described with reference to FIG. 1. The refractory materials used by applicants were different types of alumina and of zirconia, magnesia, titanates such as aluminum titanate, magnesium titanate, as well as various zirconates. As a binder for the refractory materials applicants used, more particularly silicate, phosphate, zinconate and aluminate cements which have given him complete satisfaction in the great majority of cases.

The operational method brought into play for casting the pump body comprises a certain number of preparatory processes: the magnetic parts are enveloped in ceramic fiber sheets held in position by fiber glass elements. The function of the ceramic sheet is to enable the differential expansion of the metal parts after the casting of the ceramic material. The casting of the refractory material to the outer dimensions of the volume of the coil which will be filled with liquid metal is effected very simply: a tube having slight thickness, made of the same metal as that which will be conveyed the first time, is used. This tube is made to the outer dimensions of the coil. It will be melted at the time of the first operation of the pump, and drawn off by draining of the coil when the pump is removed from the bath.

The refractory materials are cast in a mold in two parts shaped like the pump. This mold has a central core, which is also in two parts, shaped like the pump duct. The upper part of the mold is removed from the top, and the lower part from the bottom before the refractory materials have completely set. During the casting of the refractory materials, the magnetic parts of the two magnetic circuit and the refractory tube for forming the loop are positioned in a fixture in relation to the upper plane of the mold. When the refractory materials are cast, the mold can, to great advantage, be vibrated, for certain cements, on a vibrating table, so as to make the refractory material penetrate as much as possible in order to make it homogenous.

Although the device which have just been described appear to afford the greatest advantages, for implementing the invention, it will be understood that various modifications may be made thereto without going beyond the scope of the invention, it being possible to replace certain elements by others capable of fulfilling the same technical function therein, more particularly for forming the wells of the liquid coil.

What Is claimed is:

1. In an immersion pump having slight bulk and adapted for use with very corrosive liquid metals, said pump operating by conduction and comprising:
   a vertical liquid metal duct between two electrodes;
   a horizontal conduction loop electrically connected to the two electrodes;
   a main magnetic circuit containing a main winding and connected to the two electrodes;
   a secondary magnetic circuit with its winding disposed so as to induce a current in said horizontal conduction loop; and
   a pump body covered by a housing containing the two windings, the improvement wherein said horizontal conduction loop is made of a liquid metal.

2. An immersion pump as claimed in claim 1, wherein the liquid metal forming said horizontal conduction loop is the same very corrosive liquid metal flowing in the pump body.

3. An immersion pump as claimed in claim 2 wherein said horizontal conduction loop is adapted to connect to the very corrosive liquid metal flowing in the pump body throught at least one duct leading into the immersed part of the pump body.

4. An immersion pump as claimed in claim 2 wherein the pump body comprises a block of refractory material having a substantially polyhedrical external shape cast round the elements forming the pump, to support them in a predetermined position and to isolate them from any accidental contact with the corrosive liquid metal.

5. An immersion pump as claimed in claim 4 wherein the pump body is protected in its part which is not immersed, by a lower housing resting on the shoulder formed by refractory material of the pump body and ending, at its upper part, in a faced flange on which an upper housing rests through a flange, also faced, and wherein the two housings are joined together by flanges coupled together.

6. An immersion pump as claimed in claim 1 wherein the loop is connected to the atmosphere through a duct leading to the surface of the pump body beyond the immersed part of the pump body.

7. An immersion pump as claimed in claim 6 wherein the upper housing comprises an axial passage for the heat-proof metal outlet duct, and has, at its periphery, a fresh air inlet channel and a hot gas evacuation channel.

8. In a magnetohydrodynamic conduction pump adapted for use while immersed in a very corrosive liquid metal and containing a horizontal conduction loop electrically connected to two electrodes between which a vertical liquid metal duct is passed, the improvement wherein said horizontal conduction loop is made of a liquid metal.

* * * * *